United States Patent
Kawanishi

(10) Patent No.: US 8,800,950 B2
(45) Date of Patent: Aug. 12, 2014

(54) VEHICLE OUTSIDE MIRROR DEVICE

(75) Inventor: Jouichi Kawanishi, Isehara (JP)

(73) Assignee: Ichikoh Industries, Ltd., Isehara-shi (JP)

( * ) Notice: Subject to any disclaimer, the term of this patent is extended or adjusted under 35 U.S.C. 154(b) by 122 days.

(21) Appl. No.: 13/315,741

(22) Filed: Dec. 9, 2011

(65) Prior Publication Data

US 2012/0145871 A1 Jun. 14, 2012

(30) Foreign Application Priority Data

Dec. 14, 2010 (JP) ................................. 2010-278575

(51) Int. Cl.
*B60R 1/06* (2006.01)

(52) U.S. Cl.
USPC ............................ 248/477; 248/289; 248/496

(58) Field of Classification Search
USPC .............. 248/475.1, 476, 477, 289, 495, 496, 248/551; 359/841, 844
See application file for complete search history.

(56) References Cited

U.S. PATENT DOCUMENTS

| | | | |
|---|---|---|---|
| 5,639,054 A * | 6/1997 | Gerndt et al. | 248/478 |
| 5,867,328 A | 2/1999 | Stapp et al. | |
| 6,371,619 B1 * | 4/2002 | Assinder et al. | 359/841 |
| 6,609,800 B2 * | 8/2003 | Assinder et al. | 359/841 |
| 7,261,272 B2 * | 8/2007 | Courbon | 248/475.1 |
| 7,490,946 B1 * | 2/2009 | Foote et al. | 359/841 |
| 2008/0149803 A1 | 6/2008 | Yoshida et al. | |
| 2008/0253008 A1 | 10/2008 | Tseng | |
| 2009/0086351 A1 * | 4/2009 | Sakata | 359/872 |

FOREIGN PATENT DOCUMENTS

EP 0 748 719 A2 12/1996
JP 2005-254969 A 9/2005

* cited by examiner

*Primary Examiner* — Steven Marsh
(74) *Attorney, Agent, or Firm* — Foley & Lardner LLP

(57) ABSTRACT

It is important to mount a mirror assembly on a shaft in such a manner as to enable tilting without a backlash. According to the present invention, an inner circumferential face of a cylinder portion 20 of a notch member 15 of a clutch mechanism 8 comes into contact with an outer circumferential face of a shaft 3, and an outer circumferential face of the cylinder portion 20 of the notch member 15 of the clutch mechanism 8 comes into contact with an inner circumferential face of a housing portion 9 of a mirror assembly 4, respectively. As a result, the present invention is capable of mounting the mirror assembly 4 on the shaft 3 in such a manner to enable tilting without a backlash, by means of the cylinder portion 20 of the notch member 15 of the clutch mechanism 8.

3 Claims, 11 Drawing Sheets

VEHICLE OUTSIDE MIRROR DEVICE

CROSS REFERENCE TO RELATED APPLICATIONS

This application claims priority of Japanese Patent Application No. 2010-278575 filed on Dec. 14, 2010. The contents of this application are incorporated herein by reference in their entirety.

BACKGROUND OF THE INVENTION

1. Field of the Invention

The present invention relates to a vehicle outside mirror device in which a mirror assembly is capable of tilting (rotating or turning) relative to a vehicle body. In other words, the present invention relates to a vehicle outside mirror device such as a manually driven storage type door mirror or an electrically driven storage type door mirror, for example.

2. Description of the Related Art

A vehicle outside mirror device of such type is conventionally known (for example, Japanese Unexamined Patent Application Publication No. 2005-254969). Hereinafter, a conventional vehicle outside mirror device will be described. The conventional vehicle outside mirror device is provided with: a mirror base that is fixed to a door; a shaft that is fixed to the base mirror; a mirror main body portion that is mounted on the shaft in such a manner as to enable tilting; and a clutch mechanism that is provided between the shaft and the mirror main body portion. In addition, in the conventional vehicle outside mirror device, in general, the mirror main body portion is positioned in a use location in accordance with an engagement state of the clutch mechanism, and if an external force is applied to the mirror main body portion, the clutch mechanism is established in its disengaged state, the mirror main body portion rotates around the shaft, and then, a buffering action works.

In such a vehicle outside mirror device, it is important to mount the mirror main body portion on the shaft in such a manner as to enable tilting without a backlash so that a mirror face (a mirror surface) of the mirror main body portion is not moved due to vibration of a vehicle or the like.

The present invention has been made in order to solve the above-described problem that it is important to mount the mirror main body portion (a mirror assembly) on the shaft in such a manner as to enable tilting without a backlash.

SUMMARY OF THE INVENTION

In the present invention, a vehicle outside mirror device in which a mirror assembly is capable of tilting relative to a vehicle body, said device comprising:
a base that is fixed to the vehicle body;
a shaft that is fixed to the base;
the mirror assembly that is mounted in a manner to enable tilting relative to the shaft; and
a clutch mechanism that is provided between the shaft and the mirror assembly,
wherein at the mirror assembly, a housing portion adapted to externally engage with the shaft in a manner to enable rotation around a rotational center of the shaft is provided at the mirror,
the clutch mechanism includes a notch member;
the notch member is formed of a notch portion and a cylinder portion,
the notch portion engages with a notch portion that is provided on a side of the mirror assembly or on a side of the shaft to thereby position the mirror assembly in a use location, and if an external force is applied to the mirror assembly, the notch portion on the mirror assembly side and the notch portion on the shaft side disengage from each other to thereby enable the mirror assembly to rotate around the rotational center of the shaft, and
an inner circumferential face of the cylinder portion comes into contact an outer circumferential face of the shaft, and an outer circumferential face of the cylinder portion comes into contact with an inner circumferential face of the housing portion of the mirror assembly, respectively.

The vehicle outside mirror device according to the present invention, wherein the cylinder portion of the notch member is formed in a sectional noncircular shape.

The vehicle outside mirror device according to the present invention, wherein the cylinder portion of the notch member is formed in a sectional circular shape.

The vehicle outside mirror device according to the present invention, wherein
the cylinder portion of the notch member is fouled in a sectional circular shape,
a protrusive portion that comes into linear contact with a face of a counterpart is provided on at least one of an inner circumferential face of the cylinder portion of the notch member and an outer circumferential face of the shaft, and
a protrusive portion that comes into linear contact with a face of a counterpart is provided on at least one of an outer circumferential face of the cylinder portion of the notch member and an inner circumferential face of the housing portion of the mirror assembly.

According to a vehicle outside mirror device of a first aspect of the present invention, an inner circumferential face of a cylinder portion of a notch member of a clutch mechanism comes into contact with an outer circumferential face of a shaft, and an outer circumferential face of the cylinder portion of the notch member of the clutch mechanism comes into contact with an inner circumferential face of a housing portion of a mirror assembly, respectively. Thus, the vehicle outside mirror device according to the first aspect of the present invention is capable of mounting the mirror assembly on the shaft via the cylinder portion of the notch member of the clutch mechanism in such a manner as to enable tilting without a backlash. In this manner, the vehicle outside mirror device according to the first aspect of the present invention is capable of preventing the mirror face (the mirror surface) of the mirror main body portion from being moved due to vibration of a vehicle or the like.

Moreover, in the vehicle outside mirror device according to the first aspect of the present invention, the mirror assembly is mounted on the shaft in such a manner as to enable tilting without a backlash, by means of the cylinder portion of the notch member of the clutch mechanism, and thus, there is no need to provide additional parts. As a result, the vehicle outside mirror device according to the first aspect of the present invention is capable of reducing the number of parts, and is capable of reducing manufacturing costs, in comparison with a mirror device in which a mirror assembly is mounted on a shaft in such a manner as to enable tilting without a backlash by means of additional parts.

In addition, in the vehicle outside mirror device according to a second aspect of the present invention, a sectional noncircular cylinder portion of a notch member is interposed between an outer circumferential face of a columnar or cylindrical shaft and an inner circumferential face of a sectional annular housing portion (a cylindrical portion) of a mirror assembly. Thus, in the vehicle outside mirror device according to a second aspect of the present invention, an inner circumferential face of the sectional noncircular cylinder portion of the notch member reliably faithfully comes into contact with an outer circumferential face of a cylindrical shaft, and an outer circumferential face of the sectional noncircular cylinder portion reliably faithfully comes into contact with the inner circumferential face of the sectional annular housing portion (the cylindrical portion) of the mirror assembly. In this manner, the vehicle outside mirror device according to the second aspect of the present invention is capable of reliably mounting the mirror assembly on the shaft via the cylinder portion of the notch member of the notch member of the clutch mechanism in such a manner as to enable tilting without a backlash, and is capable of reliably preventing the mirror face (the mirror surface) of the mirror assembly from being moved due to vibration of a vehicle or the like.

Further, in the vehicle outside mirror device according to a third aspect of the present invention, a sectional circular cylinder portion of a notch member is interposed between an outer circumferential face of a columnar or cylindrical shape and an inner circumferential face of a sectional annular housing portion (a cylindrical portion) of a mirror assembly. Thus, the vehicle outside mirror device according to the third aspect of the present invention is capable of smoothly performing sliding between the inner circumferential face of the sectional circular cylinder portion of the notch member and the outer circumferential face of the columnar or cylindrical shaft (rotational sliding around a rotational center of the shaft), or alternatively, sliding between the outer circumferential face of the sectional circular cylinder portion of the notch member and the inner circumferential face of the sectional annular housing portion (the cylindrical portion) of the mirror assembly (rotational sliding around a rotational center of the shaft).

Furthermore, in the vehicle outside mirror device according to a fourth aspect of the present invention, a protrusive portion reliably comes into linear contact with at least one of an inner cylindrical face of a cylinder portion of a notch member and an outer circumferential face of a shaft, and the protrusive portion reliably comes into linear contact with at least one of an outer circumferential face of the cylinder portion of the notch member and an inner circumferential face of a housing portion of a mirror assembly. As a result, the vehicle outside mirror device according to the fourth aspect of the present invention is capable of reliably mounting the mirror assembly on the shaft via the cylinder portion of the notch member of a clutch mechanism in such a manner as to enable tilting without a backlash, and is capable of reliably preventing a mirror face (a mirror surface) of the mirror assembly from being moved due to vibration of a vehicle.

Moreover, in the vehicle outside mirror device according to the fourth aspect of the present invention, a protrusive portion that comes into linear contact is interposed between an inner circumferential face of a sectional circular cylinder portion of the notch member and an outer circumferential face of a columnar or cylindrical shaft and between an outer circumferential face of the sectional circular cylinder portion of the notch member and an inner circumferential face of a sectional annular housing portion (a cylindrical portion) of the mirror assembly. Thus, the vehicle outside mirror device according to the fourth aspect of the present invention is capable of reliably performing sliding between the inner circumferential face of the sectional circular cylinder portion of the notch member and the outer circumferential face of the columnar or cylindrical shaft (rotational sliding around a rotational center of the shaft), or alternatively, sliding between the outer circumferential face of the sectional circular cylinder portion of the notch member and the inner circumferential face of the sectional annular housing portion (the cylindrical portion) of the mirror assembly (rotational sliding around a rotational center of the shaft).

DESCRIPTION OF THE PREFERRED EMBODIMENTS

Hereinafter, two of the exemplary embodiments of a vehicle outside mirror device according to the present invention will be described in detail with reference to the drawings. It should be noted that the present invention is not limited by these two embodiments.

First Embodiment

Description of Configuration

Figure 5:
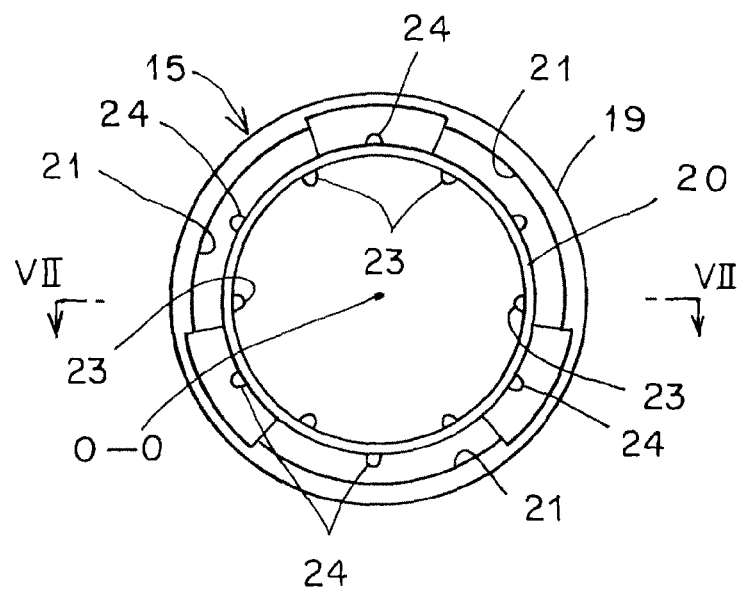
FIG. 5 is a view seen in the direction indicated by the arrow IV in FIG. 4 (a front view of a notch member), similarly.
Figure 6:
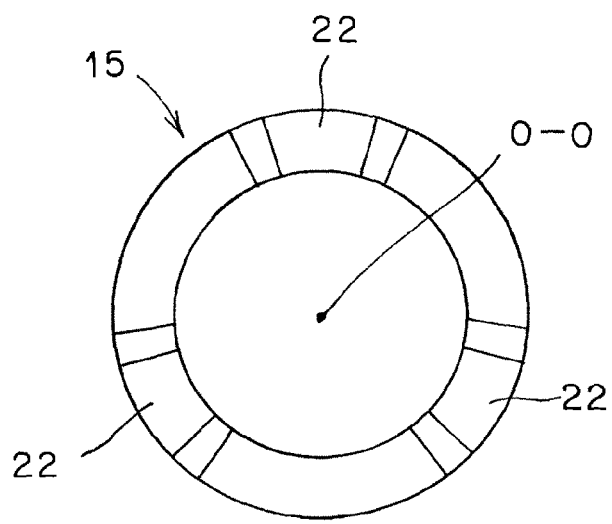
FIG. 6 is a view seen in the direction indicated by the arrow IV in FIG. 4 (a front view of a notch member), similarly.
Figure 7:
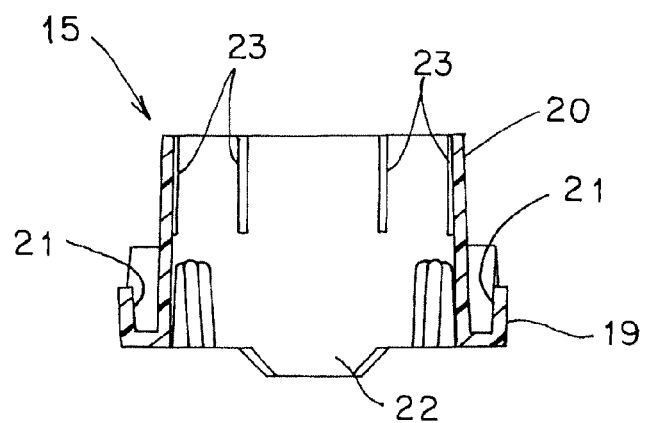
FIG. 7 is a sectional view taken along the line VII-VII in FIG. 5 (a sectional view of a notch member), similarly.

FIG. 1 to FIG. 14 each show a first embodiment of a vehicle outside mirror device according to the present invention. It should be noted that FIG. 7, which is a sectional view taken along the line VII-VII in FIG. 5 (a sectional view of a notch member), is shown in a vertically reversed manner (topside down) for the sake of clarity. Hereinafter, a configuration of the vehicle outside mirror device in the first embodiment will be described.

Figure 1:
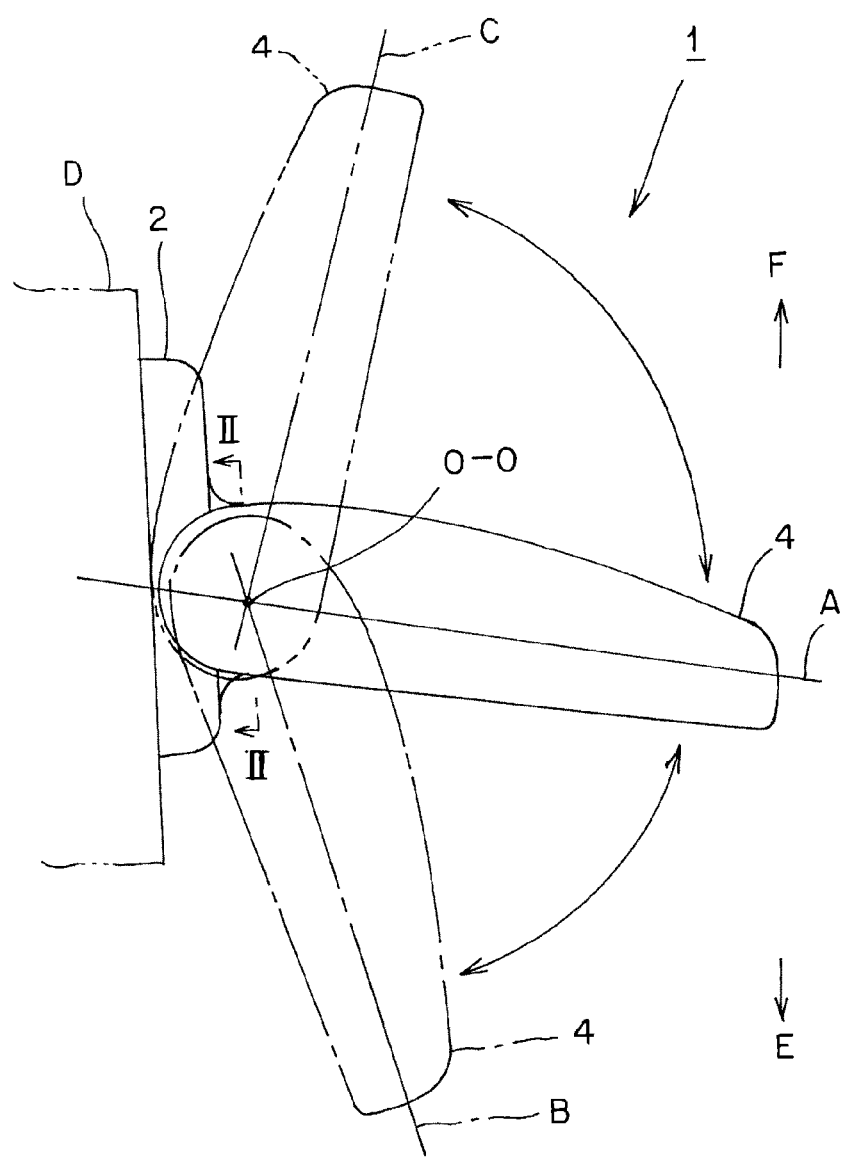
FIG. 1 is a plan view of a use state showing a first embodiment of a vehicle outside mirror device according to the present invention.

In FIG. 1, reference numeral 1 designates the vehicle outside mirror device in the first embodiment, and in this example, the reference numeral 1 designates a manually driven storage type door mirror device (a manually driven storage type door mirror). The manually driven storage type door mirror device 1 is equipped at a respective one of the left and right doors of a vehicle. The manually driven storage type door mirror device 1 of the first embodiment is equipped at the right side door of the vehicle. A manually driven storage type mirror device that is equipped at the left side door of the vehicle is substantially reversed with respect to the left and right of the manually driven storage door mirror device 1 of the first embodiment. In FIG. 1, reference uppercase letter E designates a rearward direction of a vehicle, and reference uppercase letter F designates a forward direction of the vehicle.

Figure 2:
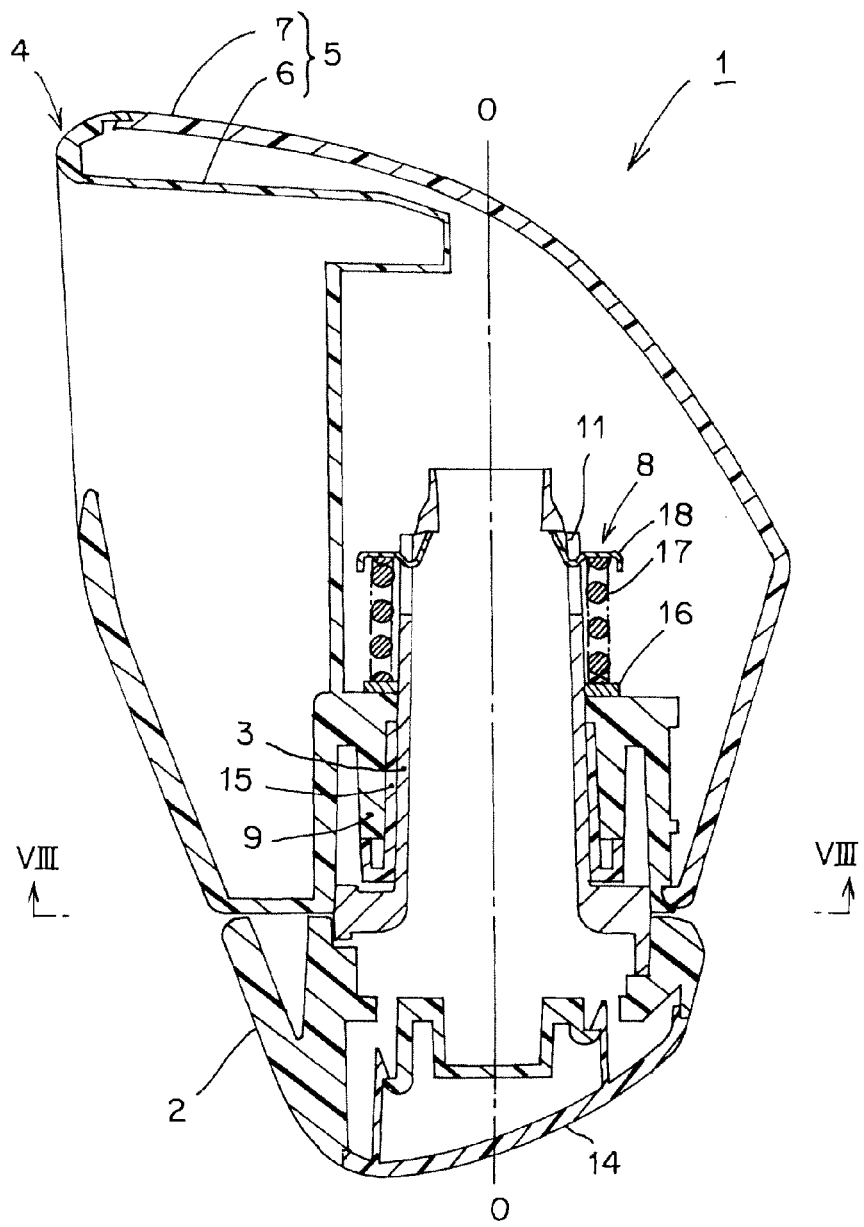
FIG. 2 is a sectional view taken along the line II-II in FIG. 1, similarly.
Figure 3:
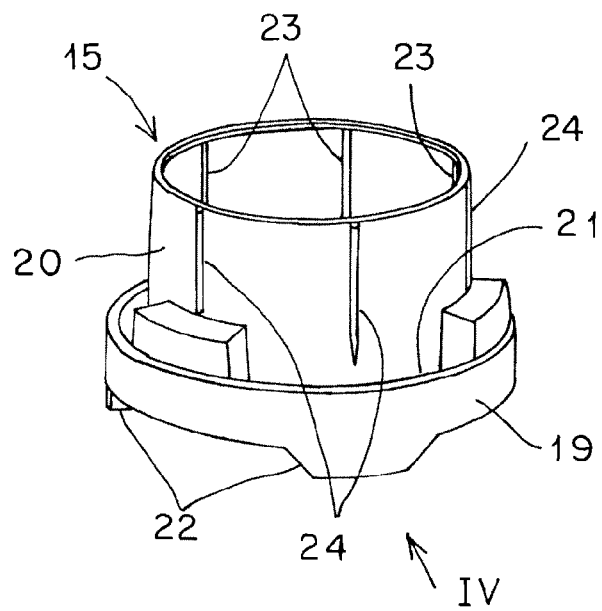
FIG. 3 is a perspective view showing a notch member, similarly.
Figure 4:
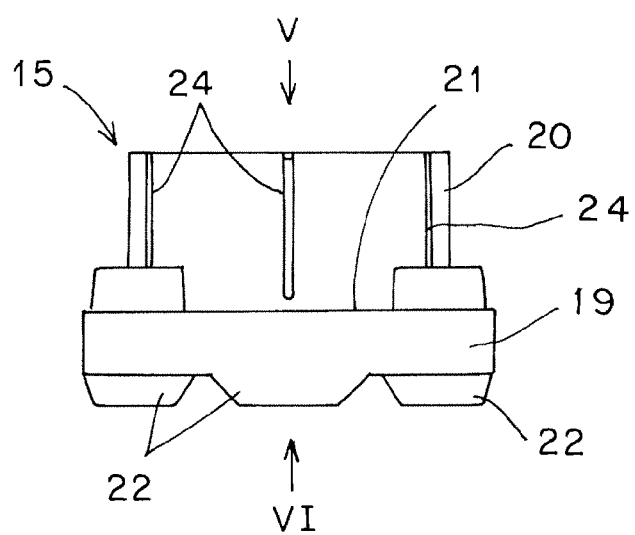
FIG. 4 is a view in the direction indicated by the arrow IV in FIG. 3 (a front view of a notch member), similarly.

The manually driven storage type door mirror device 1, as shown in FIG. 1 and FIG. 2, is provided with: a base (a mirror base) 2 that is fixed to a vehicle body (a vehicle door) D; a shaft 3 that is fixed to the base 2; a mirror assembly 4 that is mounted on the shaft 3 in such a manner as to enable tilting; and a clutch mechanism 8 that is provided between the shaft 3 at a fixing side and the mirror assembly 4 at a rotating side.

The mirror assembly 4, as shown in FIG. 1 and FIG. 2, is formed of: a mirror housing 5; a power unit (not shown); and a mirror (a mirror unit), although not shown. The mirror housing 5 is formed of: a main body portion 6 which also serves as a mount bracket; and a cover portion 7 on which the main body portion 6 is mounted. The power unit is mounted on the main body portion 6. The mirror is mounted on the power unit in such a manner as to enable tilting vertically or horizontally.

Figure 8:
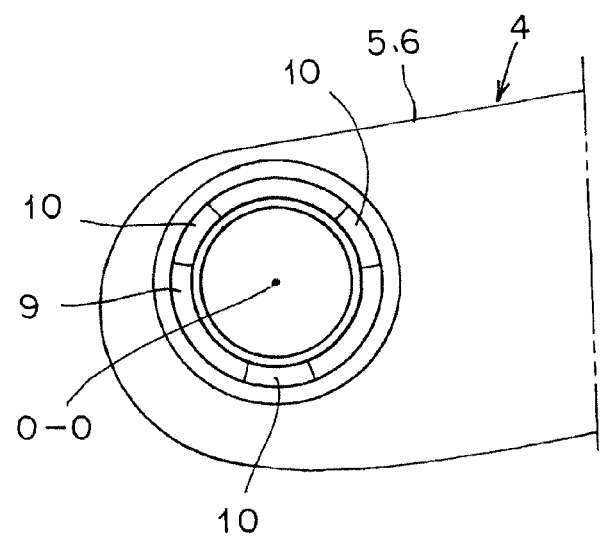
FIG. 8 is a view taken along the line VIII-VIII in FIG. 2 (a partial bottom view of a mirror housing), similarly.
Figure 10:
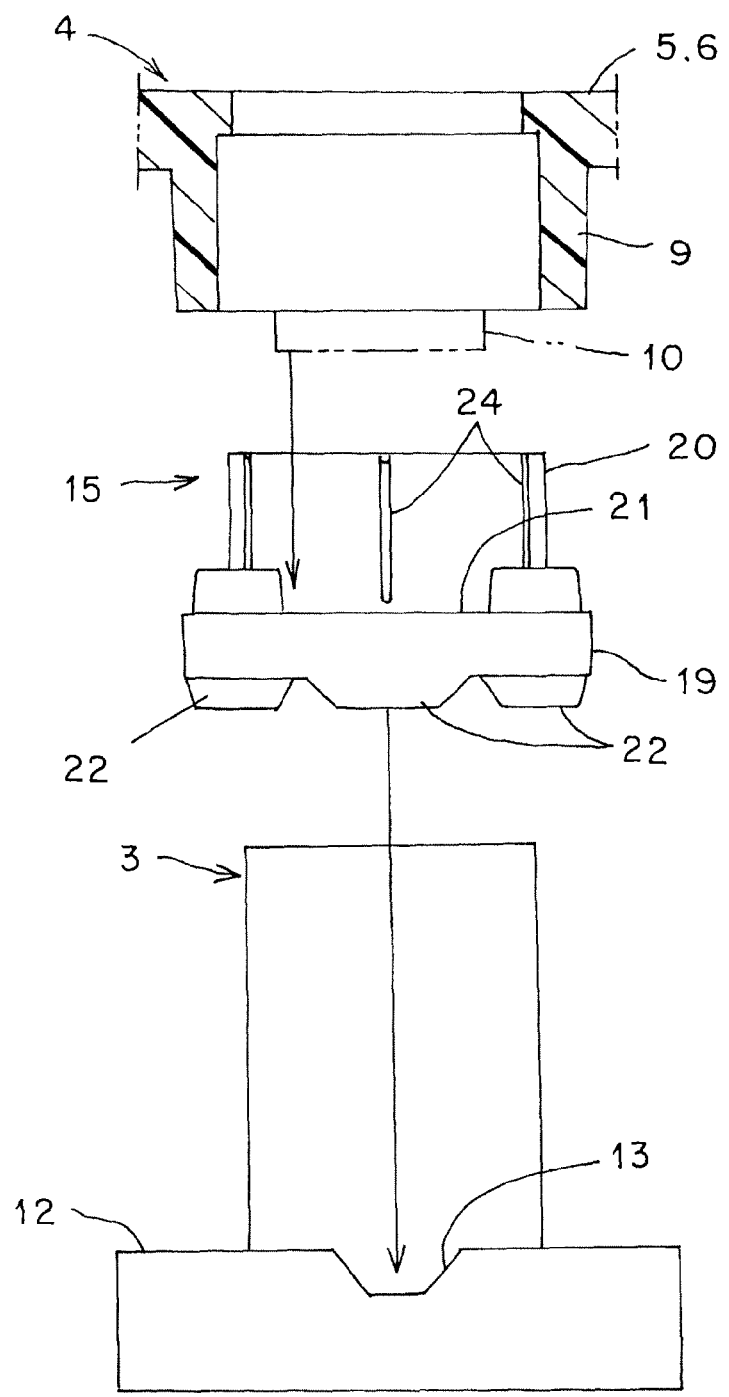
FIG. 10 is an exploded explanatory view showing a shaft and a shaft holder, a mirror housing, and a notch member, similarly.

A housing portion 9 that engages (externally engages) with the shaft 3 in such a manner as to enable rotation around a rotational center O-O of the shaft 3 is integrally provided at the main body portion 6 of the mirror assembly 4. The housing portion 9, as shown in FIG. 2, FIG. 8, FIG. 10, FIG. 11, and FIG. 12, forms a sectional annular cylindrical portion. As shown in FIG. 8 and FIG. 10, at one end face (a lower end face) of the housing portion 9, one or a plurality of, in this example, three fixing protrusive portions 10 are integrally provided at equal intervals (at equal opening angles). The fixing protrusive portion 10 shown in FIG. 10 is indicated by the double-dotted chain line for the sake of clarity.

Figure 9:
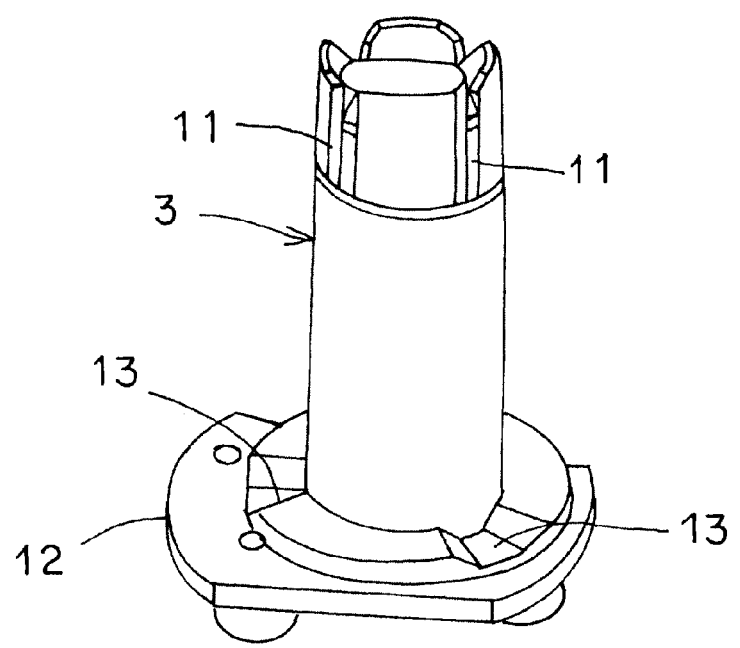
FIG. 9 is a perspective view showing a shaft and a shaft holder, similarly.

The shaft 3, as shown in FIG. 2, FIG. 9, and FIG. 10, is formed in a hollow cylindrical shape, and is configured so that a harness (not shown) is inserted through the shaft. At an upper end part of the shaft 3, a groove 11 is provided. At a lower end part of the shaft 3, a shaft holder 12 is integrally provided.

On one face (a top face) of the shaft holder 12, one or a plurality of, in this example, three clutch recessed portions 13 are integrally provided at equal intervals (at equal opening angles). The clutch recessed portions 13 are respectively made of a bottom part and each inclined side part. The shaft holder 12 of the shaft 3 is fixed to the base 2 by means of screw (not shown). The base 2 is fixed to the door D. At a lower part of the base 2, a cover 14 is mounted.

On the shaft 3, the housing portion 9 of the mirror assembly 4 externally engages rotatably with the periphery of a rotational center O-O of the shaft 3. As a result, the mirror assembly 4 is mounted on the shaft 3 in such a manner as to enable tilting, and is also mounted on the door D in such a manner as to enable tilting.

The clutch mechanism 8, as shown in FIG. 2, is provided with a notch member 15, a washer 16, a spring 17, and a push nut 18. The clutch mechanism 8 is provided between the shaft 3 at a fixing side and the mirror assembly 4 at a rotating side. In the clutch mechanism 8, the mirror assembly 4 is positioned in a use location A, and if an external force is applied to the mirror assembly 4, the mirror assembly 4 is rotated around the rotational center O-O of the shaft 3 for the sake of buffering.

The notch member 15 is interposed between the shaft 3 at the fixing side and the housing portion 9 of the mirror assembly 4 at the rotating side. The notch member 15 is adapted to stabilize a torque of the clutch mechanism 8.

The washer 16 is interposed between the housing portion 9 of the mirror assembly 4 and the spring 17. The washer 16 is adapted for the mirror assembly 4 to rotate smoothly relative to the shaft 3.

The spring 17 externally engages with the shaft 3, and is interposed between the push nut 18 of the shaft 3 at the fixing side and the washer 16 of the housing portion 9 of the mirror assembly 4 at the rotating side. The spring 17 is adapted to obtain an appropriate retaining force so that a mirror face (a mirror surface) of the mirror assembly 4 is not moved at a time such as while in vehicle travelling.

The push nut 18 is engagingly fixed to the groove 11 of the shaft 3. The push nut 18 is adapted to retain an elastic force of the spring 17.

The notch member 15 has flexibility, and is made of an inexpensive resin member with its low friction and friction resistance properties, for example, POM (polyacetal or acetal resin) or PPS (polyphenylene sulfide). The notch member 15, as shown in FIG. 3 to FIG. 7, is formed of a notch portion 19 and a cylinder portion 20.

The cylinder portion 20 is formed in a sectional circular cylinder shape. At one end part (a lower end part) of the cylinder portion 20, the notch portion 19 is integrally provided.

At one face (a top face) side of the notch portion 19, a fixing recessed portion 21 to which the fixing protrusive portion 10 of the housing portion 9 of the mirror assembly 4 is provided. The fixing recessed portion 21 is provided in one or plurality, in this example, in three at equal intervals (at equal opening angles) in correspondence with the fixing protrusive portion 10. The fixing protrusive portion 10 of the housing portion 9 of the mirror assembly 4 is engagingly fixed to the fixing recessed portion 21 of the notch portion 19 of the notch member 15.

At another face (a lower face) side of the notch portion 19, a clutch protrusive portion 22 with which the clutch recessed portion 13 of the shaft holder 12 of the shaft 3 engages is integrally provided. The clutch protrusive portion 22 is provided in one or a plurality, in this example, in three at equal intervals (at equal opening angles) in correspondence with the clutch recessed portion 13. The clutch protrusive portion 22 is formed of a reversed V-shaped portion and each inclined side part. The clutch recessed portion 13 of the shaft holder 12 of the shaft 3 intermittently engages with the clutch protrusive portion 22 of the notch portion 19 of the notch member 15.

Figure 12:
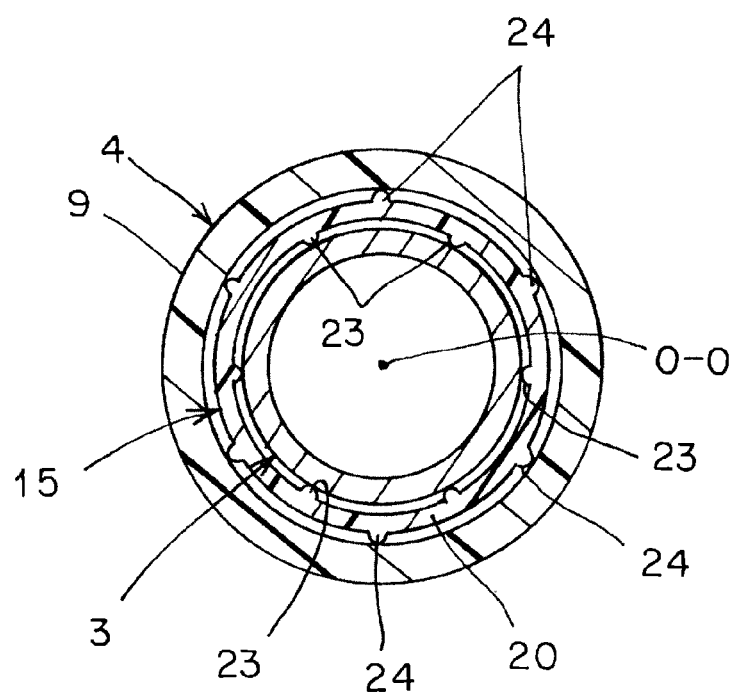
FIG. 12 is a sectional view taken along the line XII-XII in FIG. 11 (a sectional view of a state in which a shaft and a shaft holder, a mirror housing, and a notch member are assembled), similarly.

On an inner circumferential face and on an outer circumferential face of the cylinder portion 20 of the notch member 15, one or a plurality of, in this example, six protrusive portions (bead portions) 23 and 24 are respectively integrally provided at equal intervals (at equal opening angles) from the other end (an upper end) to partway of one end of the cylinder portion 20 in an axial direction (in the rotational center O-O of the shaft 3). The protrusive portion 23 of the inner circumferential face of the cylinder portion 21 of the notch member 15, as shown in FIG. 12, wraps on and comes into contact with an outer circumferential face of the shaft 3. The protrusive portion 24 of the outer circumferential face of the cylinder portion 20 of the notch member 15, as shown in FIG. 12 similarly, wraps on and comes into contact with an inner circumferential face of the housing portion 9 of the mirror assembly 4.

(Description of Function)

The manually driven storage type door mirror device 1 in the first embodiment is made of the constituent elements as described above, hereinafter, a functional description will be given.

Figure 11:
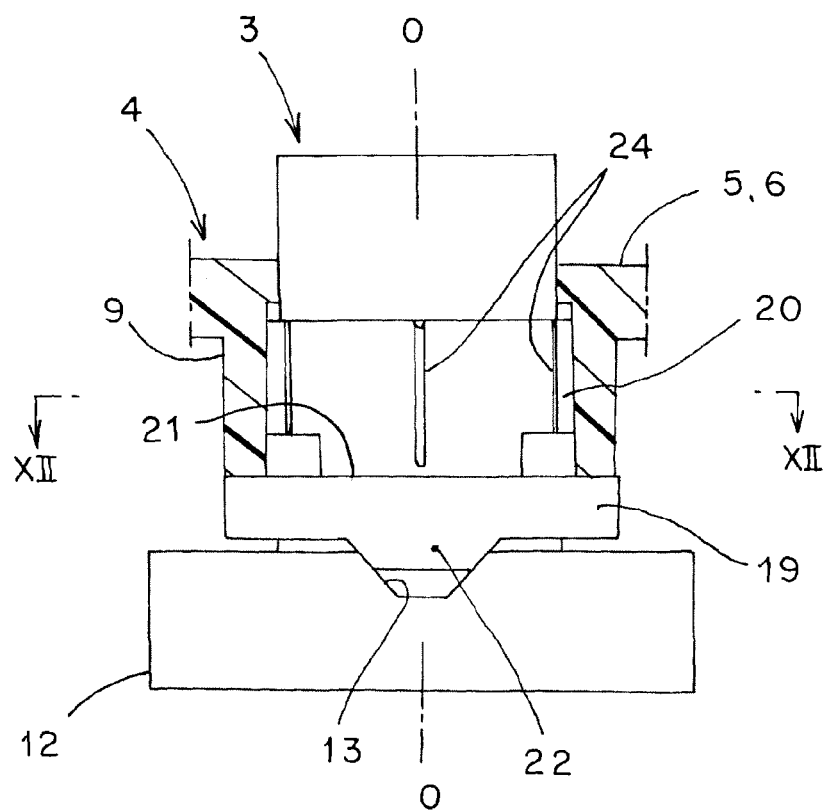
FIG. 11 is an explanatory view showing a state in which a shaft and a shaft holder, a mirror housing, and a notch member are assembled, similarly.
Figure 13:
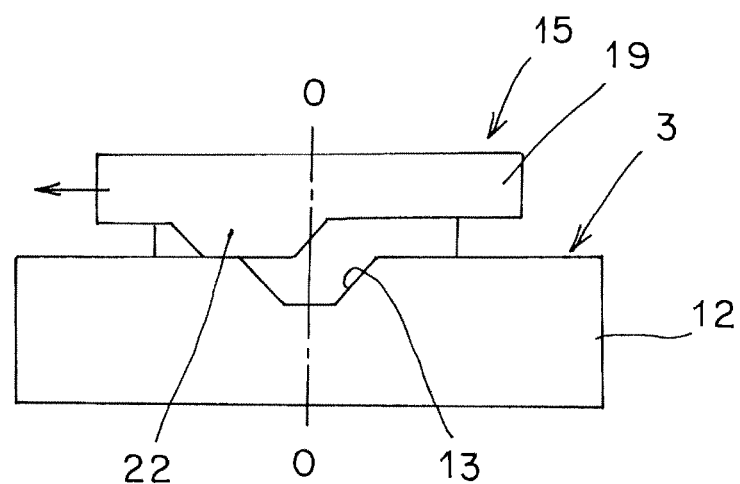
FIG. 13 is an explanatory view showing a state in which a notch member and a shaft holder disengage from each other and then the notch member rotates together with a mirror assembly in the clockwise direction, similarly.

In general, as shown in FIG. 11, a clutch protrusive portion 22 of a clutch mechanism 8 and a clutch recessed portion 13 of a shaft 3 engage with each other, and a minor assembly 4, as shown in FIG. 1, is positioned in a use location A. The mirror assembly 4 that is positioned in the use location A is allowed to be manually rotated in the clockwise direction. Then, as shown in FIG. 13, the clutch protrusive portion 22 of the clutch mechanism 8 and the clutch recessed portion 13 of the shaft 3 disengage from each other. As a result, the mirror assembly 4 rotates from the use location A to a rearward storage location (rearward tilt location) B, and is stored.

Figure 14:
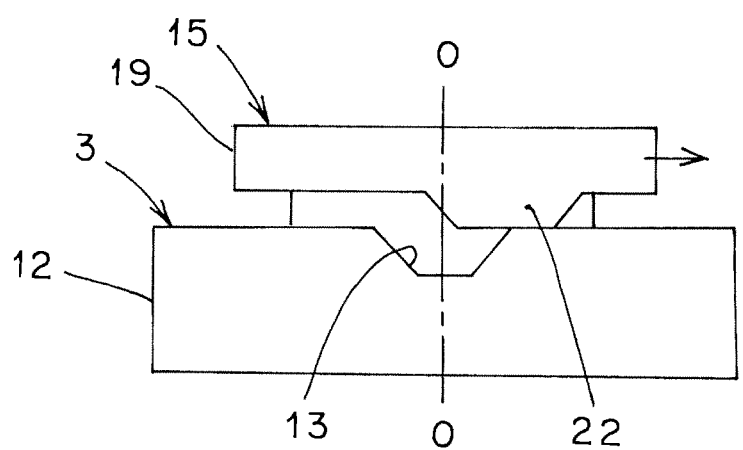
FIG. 14 is an explanatory view showing a state in which a notch member and a shaft holder disengage from each other and then the notch member rotates together with a mirror assembly in the counterclockwise direction, similarly.

In addition, the mirror assembly 4 that is positioned in the use location A is allowed to be manually rotated in the counterclockwise direction. Then, as shown in FIG. 14, the clutch protrusive portion 22 of the clutch mechanism 8 and the clutch recessed portion 13 of the shaft 3 disengage from each other. As a result, the mirror assembly 4 rotates from the use location A to a forward tilt location C, and is stored.

Further, if an external force in the clockwise direction is applied to the mirror assembly 4 that is positioned in the use location A, as shown in FIG. 13 the clutch protrusive portion 22 of the clutch mechanism 8 and the clutch recessed portion 13 of the shaft 3 disengage from each other. As a result, the mirror assembly 4 rotates and tilts from the use location A to the rearward storage location (the rearward tilt location) B, and is buffered.

Furthermore, if an external force in the counterclockwise direction is applied to the mirror assembly 4 that is positioned in the use location A, as shown in FIG. 14 the clutch protrusive portion 22 of the clutch mechanism 8 and the clutch recessed portion 13 of the shaft 3 disengage from each other. As a result, the mirror assembly 4 rotates and tilts from the use location A to the forward tilt location C, and is buffered.

Then, the mirror assembly 4 that is positioned in the rearward storage location (the rearward tilt location) B or the forward tilt location C is allowed to be manually rotated in the counterclockwise direction or in the clockwise direction, whereby the clutch protrusive portion 22 of the clutch mechanism 8 and the clutch recessed portion 13 of the shaft 3, as shown in FIG. 11, engage with each other and then the mirror assembly 4, as shown in FIG. 1 is restored and positioned in the use location A.

Then, when the mirror assembly 4 rotates around the rotational center O-O of the shaft 3, the housing portion 9 of the mirror assembly 4 and the notch member 15 of the clutch mechanism 8 are integrally fixed to each other, both of which rotate around the rotational center O-O of the shaft 3. At this time, as shown in FIG. 12, a protrusive portion 23 of an inner circumferential face of the cylinder portion 20 of the notch member 15 that is made of a resin member with its low friction and an outer circumferential face of the shaft 3 wrap on and come into contact with each other, and thus, the rotation is smoothly performed.

(Description of Advantageous Effect(s))

The manually driven storage type door mirror device 1 in the first embodiment is made of the constituent elements and functions as described above, hereinafter, its advantageous effect(s) will be described.

According to the manually driven storage type door mirror device 1 in the first embodiment, an inner circumferential face of a cylinder portion 20 of a notch member 15 of a clutch mechanism 8 (a protrusive portion 23 of the inner circumferential face) wraps on and comes into contact with an outer circumferential face of a shaft 3, and an outer circumferential face of the cylinder portion 20 of the notch member 15 of the clutch mechanism 8 (a protrusive portion 24 of the outer circumferential face) wraps on and comes into contact with an inner circumferential face of a housing portion 9 of a mirror assembly 4, respectively. Thus, the manually driven storage type door mirror device 1 in the first embodiment is capable of mounting the mirror assembly 4 on the shaft 3 via the cylinder portion 20 of the notch member 15 of the clutch mechanism 8 in such a manner as to enable tilting without a backlash. In this manner, the manually driven storage type door mirror device 1 in the first embodiment is capable of preventing a mirror face (a mirror surface) of the mirror assembly 4 from being moved due to vibration of a vehicle or the like.

Moreover, according to the manually driven storage type door mirror device 1 in the first embodiment, the mirror assembly 4 is mounted on the shaft 3 in such a manner as to enable tilting without a backlash by means of the cylinder portion 20 of the notch member 15 of the clutch mechanism 8, and thus, there is no need to provide additional parts. As a result, the manually driven storage type door mirror device 1 in the first embodiment is capable of reducing the number of parts, and is capable of reducing manufacturing costs, in comparison with a mirror device in which a mirror assembly is mounted on a shaft in such a manner as to enable tilting without a backlash by means of additional parts.

Further, according to the manually driven storage type door mirror device 1 in the first embodiment, a sectional circular cylinder portion 20 of the notch member 15 is interposed between an outer circumferential face of a columnar or cylindrical shaft 3 and a sectional annular housing portion (a cylindrical portion) 9 of the mirror assembly 4. Thus, the manually driven storage type door mirror device 1 in the first embodiment is capable of smoothly performing sliding between the inner circumferential face of the sectional circular cylinder portion 20 of the notch member 15 and the outer circumferential face of the columnar or cylindrical shaft 3 (rotational sliding around a rotational center O-O of the shaft 3).

Furthermore, according to the manually driven storage type door mirror device 1 in the first embodiment, the protrusive portion 23 of an inner circumferential face of the cylinder portion 20 of the notch member 15 reliably wraps on and comes into linear contact with an outer circumferential face of the shaft 3, and a protrusive portion 24 of an outer circumferential face of the cylinder portion 20 of the notch member 15 reliably wraps on and comes into contact with an inner circumferential face of the housing portion 9 of the mirror assembly 4. As a result, the manually driven storage type door mirror device 1 in the first embodiment is capable of reliably mounting the mirror assembly 4 on the shaft 3 via the cylinder portion 20 of the notch member 15 of the clutch mechanism 8 in such a manner as to enable tilting without a backlash, and is capable of reliably preventing the mirror face (the mirror surface) of the mirror assembly 4 from being moved due to vibration of a vehicle or the like.

According to the manually driven storage type door mirror device 1 in the first embodiment, protrusive portions 23 and 24 that come into linear contact are interposed between an inner circumferential face of a sectional circular cylinder portion 20 of the notch member 15 and an outer circumferential face of a columnar or cylindrical shaft 3 and between an outer circumferential face of the sectional circular cylinder portion 20 of the notch member 15 and an inner circumferential face of a sectional annular housing portion (a cylindrical portion) 9 of the mirror assembly 4. Thus, the manually driven storage type door mirror device 1 in the first embodiment is capable of reliably performing sliding between the inner circumferential face of the sectional circular cylinder portion 20 of the notch member 15 and the outer circumferential face of the columnar or cylindrical shaft 3 (rotational sliding around a rotational center of the shaft 3), or alternatively, sliding between the outer circumferential face of the sectional circular cylinder portion 20 of the notch member 15 and the inner circumferential face of the sectional annular housing portion (the cylindrical portion) 9 of the mirror assembly 4 (rotational sliding around a rotational center of the shaft 3).

Second Embodiment

Figure 15:
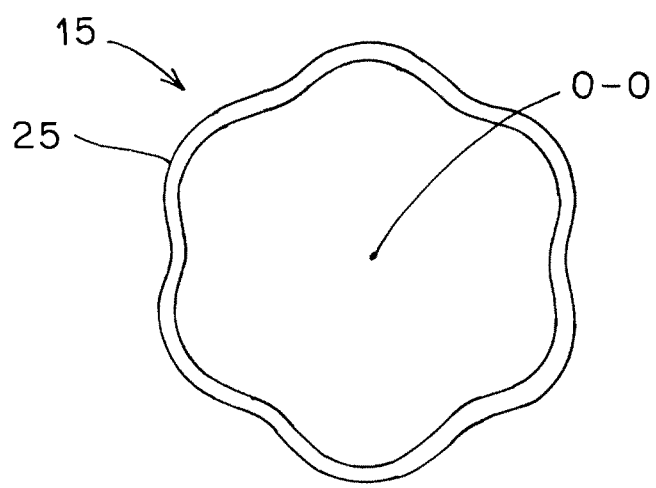
FIG. 15 is a plan view of a cylinder portion of a notch member, showing a second embodiment of a vehicle outside mirror device according to the present invention.

FIG. 15 shows a second embodiment of a vehicle outside mirror device according to the present invention. In the figure, like constituent elements of FIG. 1 to FIG. 14 are designated by like reference numerals. According to the first embodiment, the cylinder portion 20 of the notch member 15 is formed in a sectional circular cylinder shape. Alternatively, according to the second embodiment, a cylinder portion 25 of a notch member 15 is formed in a sectional noncircular shape, or alternatively, in this example, in a wavy cylindrical shape.

The vehicle outside mirror device of the second embodiment is capable of achieving functions and advantageous effects that are substantially identical to those of the vehicle outside mirror device of the first embodiment. In particular, according to a manually driven storage type door mirror device 1 in the second embodiment, a sectional noncircular cylinder portion 25 of the notch member 15 is interposed between an outer circumferential face of a columnar or cylindrical shaft 3 and an inner circumferential face of a sectional annular housing portion (a cylindrical portion) 9 of a mirror assembly 4. Thus, according to the manually driven storage type door mirror device 1 in the second embodiment, an inner circumferential face of the sectional noncircular cylinder portion 25 of the notch member 15 reliably faithfully comes into contact with the outer circumferential face of the column shape or cylinder shape shaft 3. The outer circumferential face of the sectional noncircular cylinder portion 25 of the notch member reliably faithfully comes into contact with the inner circumferential face of the sectional annular housing portion (the cylindrical portion) 9 of the mirror assembly 4. In this manner, the manually driven storage type door mirror device 1 in the second embodiment is capable of reliably mounting the minor assembly 4 on the shaft 3 via the cylinder portion 25 of the notch member 15 of the clutch mechanism 8 in such a manner as to enable tilting without a backlash, and is capable of reliably preventing the mirror face (the mirror surface) of the mirror assembly 4 from being moved due to vibration of a vehicle or the like.

(Description of Examples Other than First and Second Embodiments)

The foregoing first and second embodiments describe a manually driven storage type door minor device. However, the preset invention is also applicable to a vehicle outside minor device other than such a manually driven storage type mirror device. For example, the present invention is applicable to a manually driven storage type vehicle outside mirror such as a vehicle fender minor device of a manually driven storage type or a track minor device of a manually driven storage type as well.

In addition, the foregoing first and second embodiments describe a manually driven storage type door mirror device. However, the present invention is also applicable to a vehicle outside mirror device other than such a manually driven storage type mirror device as well. For example, the present invention is applicable to an electrically driven storage type vehicle outside minor device such as a door mirror device of an electrically driven storage type, a vehicle fender minor device of an electrically driven storage type, or a track mirror device of an electrically driven storage type.

In the case of the electrically driven storage type described previously, a notch member 15 is interposed between a casing of an electrically driven storage unit at a rotating side and a shaft at a fixing side. In addition, in the case of the electrically driven storage type described previously, a second clutch mechanism made of a clutch gear and a clutch holder may be provided in addition to a clutch mechanism 8 having the notch member 15.

Further, in the foregoing first and second embodiments, a notch member 15 integrally rotates relative to a shaft 3 together with a minor assembly 4. However, in the present invention, only a mirror assembly may rotate without a notch member integrally rotating together with a shaft.

Furthermore, in the foregoing first embodiment, a protrusive portion 23 that comes into linear contact with an outer circumferential face of a shaft 3 is provided on an inner circumferential face of a cylinder portion 20 of a notch member 15. However, in the present embodiment, a protrusive portion that comes into linear contact with an inner circumferential face of a cylinder portion of a notch member may be provided on an outer circumferential face of a shaft, or alternatively, a protrusive portion that comes into linear contact with an face of a counterpart (an outer circumferential face of a shaft and an inner circumferential face of a cylinder portion of a notch member) may be provided on the inner circumferential face of the notch member and on the outer circumference of the shaft.

Still furthermore, in the foregoing first embodiment, a protrusive portion 24 that comes into linear contact with an inner circumferential face of a housing portion 9 of a mirror assembly 4 is provided on an outer circumferential face of a cylinder portion 20 of a notch member 15. However, in the present invention, a protrusive portion that comes into linear contact with an outer circumferential face of a cylinder portion of a notch member may be provided on an inner circumferential face of a housing portion of a mirror assembly, or alternatively, a protrusive portion that comes into linear contact with a face of a counterpart (an inner circumferential face of a housing portion of a minor assembly and an outer circumferential face of a cylinder portion of a notch member) may be provided on the outer circumferential face of the cylinder portion of the notch member and on the inner circumferential face of the housing portion of the mirror assembly.

Yet furthermore, in the foregoing second embodiment, a cylinder portion 25 of a notch member 15 is foamed in a wavy cylindrical shape. However, in the present invention, a cylinder portion of a notch member may be formed in a sectional noncircular shape. For example, the cylinder portion may be formed in a shape such as a sectional triangular shape, a sectional polygonal shape or a sectional elliptical shape.

What is claimed is:

1. A vehicle outside mirror device in which a mirror assembly is capable of tilting relative to a vehicle body, said device comprising:
- a base that is fixed to the vehicle body;
- a shaft that is fixed to the base;
- the mirror assembly that is mounted in a manner to enable tilting relative to the shaft; and
- a clutch mechanism that is provided between the shaft and the mirror assembly,
- wherein at the mirror assembly, a housing portion adapted to externally engage with the shaft in a manner to enable rotation around a rotational center of the shaft is provided at the mirror,
- the clutch mechanism includes a notch member;
- the notch member is formed of a notch portion and a cylinder portion,
- the notch portion engages with a notch portion that is provided on a side of the mirror assembly or on a side of the shaft to thereby position the mirror assembly in a use location, and if an external force is applied to the mirror assembly, the notch portion on the mirror assembly side and the notch portion on the shaft side disengage from each other to thereby enable the mirror assembly to rotate around the rotational center of the shaft, and
- an inner circumferential face of the cylinder portion comes into contact with an outer circumferential face of the shaft, and an outer circumferential face of the cylinder portion comes into contact with an inner circumferential face of the housing portion of the mirror assembly, respectively, wherein
- the cylinder portion of the notch member is formed in a sectional circular shape,
- a protrusive portion that comes into linear contact with a face of a counterpart is provided on at least one of an inner circumferential face of the cylinder portion of the notch member and an outer circumferential face of the shaft, and
- a protrusive portion that comes into linear contact with a face of a counterpart is provided on at least one of an outer circumferential face of the cylinder portion of the notch member and an inner circumferential face of the housing portion of the mirror assembly.

2. The vehicle outside mirror device according to claim 1, wherein the cylinder portion of the notch member is formed in a sectional noncircular shape.

3. The vehicle outside mirror device according to claim 1, wherein the cylinder portion of the notch member is formed in a sectional circular shape.

* * * * *